United States Patent
Sung et al.

(10) Patent No.: US 11,657,594 B2
(45) Date of Patent: May 23, 2023

(54) METHOD AND APPARATUS FOR CLASSIFYING IMAGE

(71) Applicant: Polaris3D Co., Ltd., Gyeongsangbuk-do (KR)

(72) Inventors: Chi Won Sung, Gyeongsangbuk-do (KR); Jae Gun Lee, Chungcheongbuk-do (KR)

(73) Assignee: Polaris3D Co., Ltd., Gyeongsangbuk-Do (KR)

( * ) Notice: Subject to any disclaimer, the term of this patent is extended or adjusted under 35 U.S.C. 154(b) by 329 days.

(21) Appl. No.: 17/193,427

(22) Filed: Mar. 5, 2021

(65) Prior Publication Data

US 2021/0357705 A1 Nov. 18, 2021

(30) Foreign Application Priority Data

May 12, 2020 (KR) .................. 10-2020-0056679

(51) Int. Cl.
*G06V 10/44* (2022.01)
*G06N 3/08* (2023.01)
(Continued)

(52) U.S. Cl.
CPC .......... *G06V 10/454* (2022.01); *G06F 18/213* (2023.01); *G06F 18/214* (2023.01);
(Continued)

(58) Field of Classification Search
CPC .... G06V 10/454; G06V 10/774; G06V 10/82; G06V 20/41; G06V 10/469; G06V 20/46;
(Continued)

(56) References Cited

U.S. PATENT DOCUMENTS 10,832,093 B1* 11/2020 Taralova ............... G06F 18/217
11,164,003 B2* 11/2021 Jones ..................... G06V 20/40
(Continued)

FOREIGN PATENT DOCUMENTS

| KR | 10-1137110 B1 | 4/2012 |
| KR | 10-2013-0032856 A | 4/2013 |
| KR | 10-2020-0026409 A | 3/2020 |

OTHER PUBLICATIONS

Notice of Allowance dated Sep. 8, 2020 from Korean Patent Office in a counterpart Korean Patent Application No. 10-2020-0056679 (English translation is also submitted herewith.).

*Primary Examiner* — Michael S Osinski
(74) *Attorney, Agent, or Firm* — The PL Law Group, PLLC (57) ABSTRACT

An apparatus for classifying an image according to an embodiment includes a fake image generation module receiving a classification target image and a fake image in a form in which only a background exists and no specific object exists in the classification target image, a difference of images vector generation module generating a difference of images between the classification target image and the fake image and a difference of images vector by converting the generated difference of images into preset one-dimensional matrix data, a difference of feature vectors generation module generating a difference of feature vectors between a feature vector generated based on the classification target image and a feature vector generated based on the fake image, and an image classification module classifying the
(Continued)

classification target image based on the difference of images vector, the feature vector generated based on the classification target image, and the difference of feature vectors.

12 Claims, 7 Drawing Sheets

(51) Int. Cl.
  *G06F 18/2411* (2023.01)
  *G06F 18/22* (2023.01)
  *G06F 18/213* (2023.01)
  *G06F 18/214* (2023.01)
  *G06V 10/774* (2022.01)
  *G06V 10/82* (2022.01)

(52) U.S. Cl.
  CPC .......... *G06F 18/22* (2023.01); *G06F 18/2411* (2023.01); *G06N 3/08* (2013.01); *G06V 10/774* (2022.01); *G06V 10/82* (2022.01)

(58) Field of Classification Search
  CPC .............. G06V 10/764; G06V 10/776; G06V 2201/03; G06V 10/40; G06V 10/7715; G06V 10/803; G06V 20/52; G06V 20/56; G06V 20/58; G06V 20/64; G06F 18/213; G06F 18/214; G06F 18/22; G06F 18/2411; G06N 3/08; G06N 3/045; G06N 3/044; G06N 3/047; G06N 20/00; G06N 3/084; G06N 3/088; G06N 20/20; G06N 3/04; G06T 2207/20084; G06T 2207/20081; G06T 5/50; G06T 7/11; G06T 2207/10016; G06T 11/00
  See application file for complete search history.

(56) References Cited

U.S. PATENT DOCUMENTS

| | | | |
|---|---|---|---|
| 11,222,239 B2* | 1/2022 | Saito | G06V 40/107 |
| 11,417,007 B2* | 8/2022 | Kang | G06F 18/24 |
| 11,507,778 B2* | 11/2022 | Liu | G06V 10/82 |
| 11,557,085 B2* | 1/2023 | Boyce | G06V 30/274 |
| 11,562,614 B2* | 1/2023 | Wu | G06V 20/52 |
| 11,610,081 B2* | 3/2023 | Girard | G06V 40/1376 |
| 2011/0164823 A1 | 7/2011 | Park et al. | |
| 2018/0373964 A1* | 12/2018 | Kondo | G06T 5/50 |
| 2020/0134876 A1* | 4/2020 | Park | G06V 10/764 |
| 2020/0294201 A1* | 9/2020 | Planche | G06T 5/002 |
| 2020/0342362 A1* | 10/2020 | Soni | G16H 10/00 |
| 2020/0349447 A1* | 11/2020 | Zhong | G06N 3/084 |
| 2021/0019617 A1* | 1/2021 | Bang | G06N 3/047 |
| 2021/0142113 A1* | 5/2021 | Girard | G06F 18/24 |
| 2021/0158815 A1* | 5/2021 | Lee | G06V 10/764 |
| 2021/0174142 A1* | 6/2021 | Han | G06V 10/764 |
| 2021/0217197 A1* | 7/2021 | Ricco | G06T 7/269 |
| 2021/0224554 A1* | 7/2021 | Yasui | G06F 18/214 |
| 2021/0271919 A1* | 9/2021 | Yang | G06V 40/10 |
| 2021/0295063 A1* | 9/2021 | Yasui | G06V 10/764 |
| 2021/0383242 A1* | 12/2021 | Ostyakov | G06F 18/2185 |
| 2021/0397198 A1* | 12/2021 | Soltani Bozchalooi | G06N 20/00 |
| 2022/0058798 A1* | 2/2022 | Rubin | G06T 11/008 |
| 2022/0101048 A1* | 3/2022 | Tan | G06F 18/214 |
| 2022/0139062 A1* | 5/2022 | Kudo | G06V 10/40 |
| | | | 382/131 |
| 2022/0237829 A1* | 7/2022 | Ren | G06T 11/00 |
| 2022/0318956 A1* | 10/2022 | Xu | G06V 10/764 |
| 2022/0406040 A1* | 12/2022 | Ganille | G06T 11/00 |
| 2023/0049479 A1* | 2/2023 | Mozo Velasco | G06N 3/045 |

* cited by examiner

METHOD AND APPARATUS FOR CLASSIFYING IMAGE

CROSS-REFERENCE TO RELATED APPLICATION

This application claims the benefit under 35 USC § 119(a) of Korean Patent Application No. 10-2020-0056679, filed on May 12, 2020, in the Korean Intellectual Property Office, the entire disclosure of which is incorporated herein by reference for all purposes.

BACKGROUND

1. Field

An embodiment of the present invention relates to an image classification technology.

2. Description of Related Art

Generally, in a large-scale supermarket, when a product is empty on each product shelf, there is a hassle for product shelf staffs to manually check and fill a product shelf with products. Thus, a technology for automatically detecting whether or not the product is empty on the product shelf by inputting an image obtained by photographing the product shelf into a deep learning model such as a convolution neural network (CNN) has been developed, but existing technology has a problem that the accuracy of classification is degraded as a classification value is output by simply inputting the image obtained by photographing the product shelf into the CNN and has to be learned for each product and each product shelf, and thus existing technology has a limitation that can only be used in a limited environment, such as not being able to be used when the product displayed on the corresponding product shelf is changed or when the product shelf itself is changed.

Examples of related art include Korean Patent Application Publication No. 10-2020-0026409 (published on Mar. 11, 2020).

SUMMARY

An embodiment of the present invention is to provide a method and apparatus for classifying an image capable of improving classification accuracy.

An embodiment of the present invention is to provide a method and apparatus for classifying an image capable of classification regardless of an object and a background.

An apparatus for classifying an image according to an embodiment disclosed is a computing device including one or more processors and a memory storing one or more programs executed by the one or more processors, and includes a fake image generation module that receives a classification target image and generates a fake image in a form in which only a background exists and no specific object exists in the classification target image, a difference of images vector generation module that generates a difference of images between the classification target image and the fake image and generate a difference of images vector by converting the generated difference of images into preset one-dimensional matrix data, a difference of feature vectors generation module that generates a difference of feature vectors between a feature vector generated based on the classification target image and a feature vector generated based on the fake image, and an image classification module that classifies the classification target image based on the difference of images vector, the feature vector generated based on the classification target image, and the difference of feature vectors.

The fake image generation module may include a first machine learning model trained to extract a first feature vector of a preset size by reducing dimensions of the classification target image when the classification target image is input and a second machine learning model trained to output the fake image by using the first feature vector output from the first machine learning model as an input.

The first feature vector may be one-dimensional matrix data and the fake image may have the same size as the classification target image.

The difference of feature vectors generation module may include a third machine learning model which is trained to extract a second feature vector by using the classification target image as an input and extract a third feature vector by using the fake image as an input.

The third machine learning model may be a model trained to output a classification value as to whether an image input to the third machine learning model is an image composed of only a background or an image not composed of only the background.

The third machine learning model may be a convolutional neural network (CNN) model including a convolution layer, a flatten layer, and a fully-connected layer, and the difference of feature vectors generation module may extract an output of the flatten layer to be the second feature vector when the classification target image is input to the third machine learning model, and may extract the output of the flatten layer to be the third feature vector when the fake image is input to the third machine learning model.

The image classification module may generate one one-dimensional matrix data by concatenating the difference of images vector, the second feature vector, and the difference of feature vectors, respectively, and the image classification module may include a fourth machine learning model that is trained to output a classification value of the classification target image when the one one-dimensional matrix data is input.

In the apparatus for classifying the image, a random first feature vector of a preset size may be input to the second machine learning model, a fake image output from the second machine learning model may be input to the third machine learning model, and parameters of the second machine learning model may be adjusted according to a classification value for the fake image output from the third machine learning model.

In the apparatus for classifying the image, when a classification target image is input, the first machine learning model may be trained so that the fake image generated through the first machine learning model and the second machine learning model becomes an image in which only a background exists and no specific object exists in the classification target image.

In the apparatus for classifying the image, a loss function of the first machine learning model may be set by Expression 1 below.

Loss Function=first weight×(average value of differences between pixel values between classification target image and fake image)+second weight×(average value of differences between matrix values between feature vector of classification target image and feature vector of fake image). Expression 1

The feature vector of the classification target image is a second feature vector obtained by extracting the output of the flatten layer when the classification target image is input to the third machine learning model.

The feature vector of the fake image is a third feature vector obtained by extracting the output of the flatten layer when the fake image is input to the third machine learning model.

A sum of the first weight and the second weight may be one, and the second weight may be set higher than the first weight.

A method for classifying an image according to an embodiment disclosed is performed in a computing device including one or more processors and a memory storing one or more programs executed by the one or more processors, and includes receiving a classification target image and generating a fake image in a form in which only a background exists and no specific object exists in the classification target image, generating a difference of images between the classification target image and the fake image, generating a difference of images vector by converting the generated difference of images into preset one-dimensional matrix data, generating a difference of feature vectors between a feature vector generated based on the classification target image and a feature vector generated based on the fake image, and classifying the classification target image based on the difference of images vector, the feature vector generated based on the classification target image, and the difference of feature vectors.

According to the embodiment disclosed, a first feature vector is extracted through a first machine learning model when a classification target image is input, a fake image is generated using the first feature vector, a difference of images vector is generated based on the difference between the classification target image and the fake image, a difference of feature vectors between a second feature vector and a third feature vector generated by inputting the classification target image and the fake image to a third machine learning model is generated, and the classification target image is classified based on the difference of images vector, the second feature vector, and the difference of feature vectors, thereby capable of improving the accuracy of classification and performing accurate classification on various images regardless of an object and a background.

DETAILED DESCRIPTION

Hereinafter, a specific embodiment of the present invention will be described with reference to the drawings. The following detailed description is provided to aid in a comprehensive understanding of the methods, apparatus and/or systems described herein. However, this is only an example, and the disclosed embodiments are not limited thereto.

In describing the embodiments of the present invention, when it is determined that a detailed description of known technologies related to the present invention may unnecessarily obscure the subject matter of the embodiments of the present invention, a detailed description thereof will be omitted. In addition, terms to be described later are terms defined in consideration of functions in the present invention, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

In the following description, "transferring", "communication", "transmission", and "receiving" of a signal or information or other terms having similar meaning include not only direct transmission of the signal or information from one component to another, but also transmission through other components. In particular, "transmitting" or "transferring" a signal or information to a component indicates a final destination of the signal or information and does not imply a direct destination. The same is true for "receiving" a signal or information. In addition, in this specification, when two or more pieces of data or information are "related", it means that when one data (or information) is obtained, at least a part of the other data (or information) can be obtained based on the data.

In addition, terms such as first and second may be used to describe various components, but the components should not be limited by the terms. The terms may be used for the purpose of distinguishing one component from another component. For example, without deviating from the scope of the present invention, a first component may be named as a second component, and similarly, the second component may also be renamed as the first component.

Figure 1:
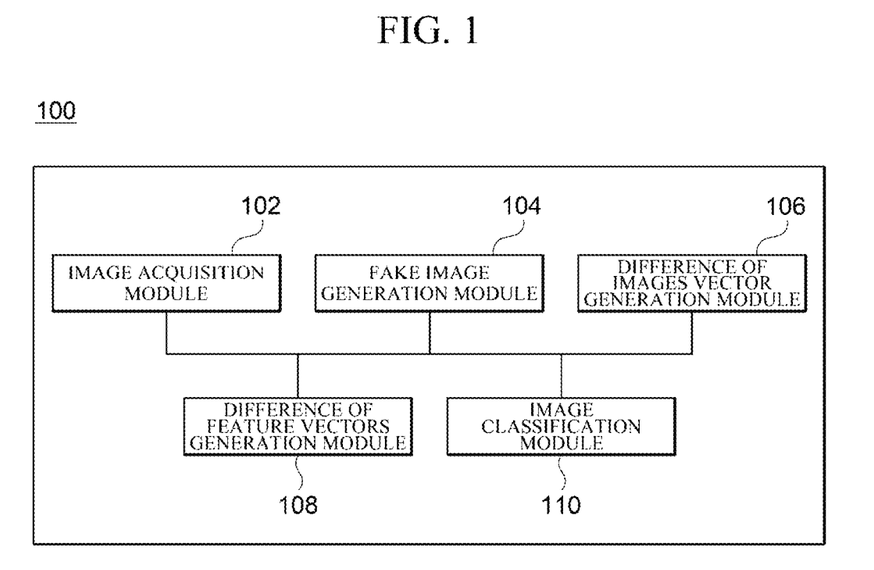
FIG. 1 is a block diagram illustrating a configuration of an apparatus for classifying an image according to an embodiment of the present invention.
Figure 2:
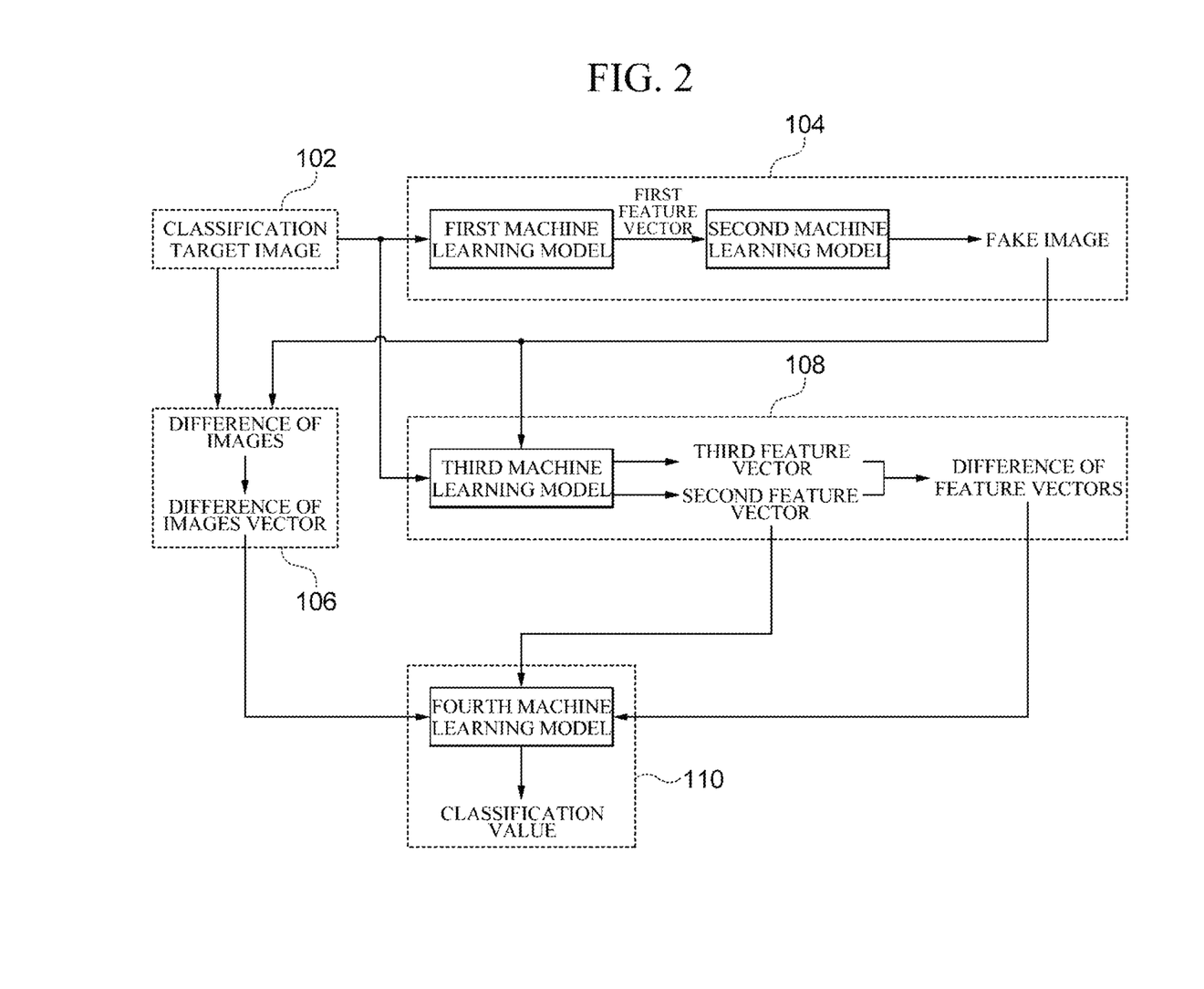
FIG. 2 is a diagram illustrating an operation of each configuration of the apparatus for classifying the image according to the embodiment of the present invention.

FIG. 1 is a block diagram illustrating a configuration of an apparatus for classifying an image according to an embodiment of the present invention, and FIG. 2 is a diagram illustrating an operation of each configuration of the apparatus for classifying the image according to the embodiment of the present invention.

Referring to FIGS. 1 and 2, an apparatus 100 for classifying an image may include an image acquisition module 102, a fake image generation module 104, a difference of images vector generation module 106, a difference of feature vectors generation module 108, and an image classification module 110.

The image acquisition module 102 may acquire an image (hereinafter, referred to as a classification target image) to be classified. In an exemplary embodiment, the classification target image may be an image classified according to whether a corresponding image is composed of only a background or a specific object in addition to the background exists in the image.

In the following, for convenience of explanation, it is assumed that the classification target image is an image obtained by photographing a product shelf in a large-scale supermarket, and it will be described that the classification target image is classified according to whether only a product shelf (i.e., a background) exists or a product (i.e., a specific object) exists on the product shelf in the image.

In other words, the apparatus 100 for classifying the image may be for classifying whether the product shelf is empty or filled with the products in the image obtained by photographing the product shelf in the large-scale supermarket. For example, the apparatus 100 for classifying the image may perform a classification operation by acquiring images obtained by photographing each product shelf by an autonomous driving robot while driving on the large-scale supermarket. However, the present invention is not limited thereto, and the apparatus 100 for classifying the image may perform classification by acquiring images photographed in various backgrounds.

Figure 3:
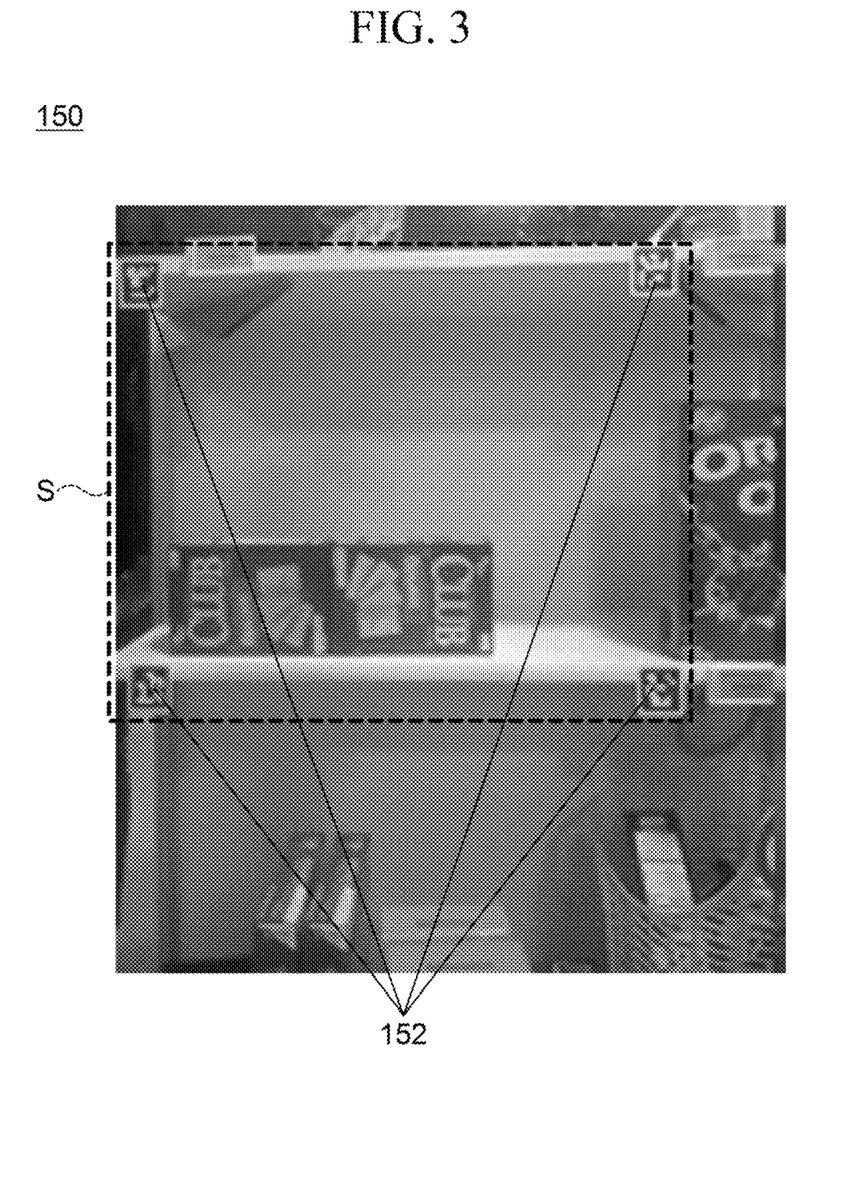
FIG. 3 is a view illustrating a state in which a certain region is extracted from an image obtained by photographing on a product shelf according to an embodiment of the present invention.

In an exemplary embodiment, the image acquisition module 102 may extract a certain region from an image obtained by photographing the product shelf. FIG. 3 is a view illustrating a state in which a certain region is extracted from an image obtained by photographing a product shelf according to an embodiment of the present invention. Referring to FIG. 3, a product shelf 150 may be formed of a plurality of tiers, and products may be displayed in a space between the tiers. Here, a marker 152 may be attached to each tier at a predetermined interval, and the image acquisition module 102 may extract a certain region S based on the marker from an image obtained by photographing the product shelf. However, the present invention is not limited thereto, and an autonomous driving robot or the like may extract a certain region of a product shelf-photographed image and transmit the image to the apparatus 100 for classifying the image.

The fake image generation module 104 may generate a fake image by using the classification target image as an input image. Here, the fake image may mean an image in a form in which only a background exists and no specific object exists in the classification target image. For example, when the input image is the product shelf-photographed image, the fake image may be an image in the form of an image in which only the product shelf exists and no product exists (i.e., an empty product shelf image).

Figure 4:
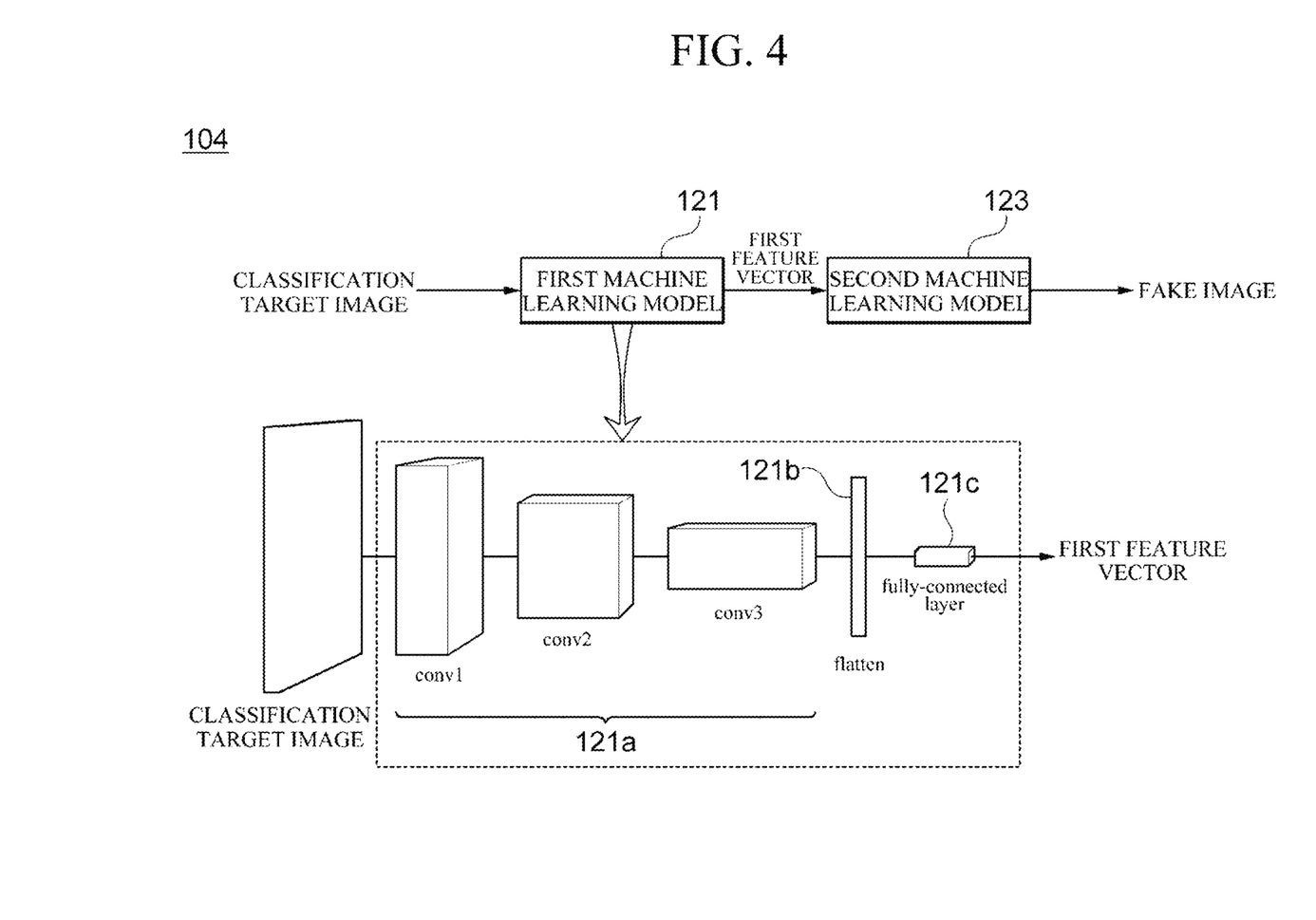
FIG. 4 is a diagram illustrating a process of generating a fake image in the apparatus for classifying the image according to the embodiment of the present invention.

FIG. 4 is a diagram illustrating a process of generating a fake image in an apparatus for classifying an image according to an embodiment of the present invention.

Referring to FIG. 4, the fake image generation module 104 may input a classification target image (i.e., an input image) into a first machine learning model 121. The first machine learning model 121 may be a machine-learned model to extract a first feature vector by reducing dimensions of the input image. In an exemplary embodiment, the first machine learning model 121 may be a convolutional neural network (CNN), but is not limited thereto.

The first machine learning model 121 may include at least one of a plurality of convolution layers and pooling layers.

Here, it is illustrated that the first machine learning model 121 includes three convolutional layers 121a, but is not limited thereto. Each convolutional layer can extract feature values of pixels (i.e., 9 pixels) corresponding to a filter of a preset size (e.g., 3×3 pixel size) while moving the filter from the input image at predetermined intervals.

In addition, the first machine learning model 121 may include a flatten layer 121b that converts the feature value extracted from the convolutional layer 121a into one-dimensional data, and a fully-connected layer 121c that outputs a first feature vector of a preset size based on the one-dimensional data converted by the flatten layer 121b. Here, the first feature vector may be formed as a one-dimensional matrix. For example, the first feature vector may be one-dimensional matrix data having a size of 1×100.

The fake image generation module 104 may input the first feature vector into a second machine learning model 123. The second machine learning model 123 may be a machine-learned model to generate a fake image having the same size as the classification target image (i.e., the input image) when the first feature vector is input. For example, the size of the fake image may be an image having a size of 129×129, but is not limited thereto.

That is, the second machine learning model 123 may receive the first feature vector as an input, and may be a machine-learned model to output the fake image in a form in which only the background exists in the classification target image and no specific object exists when the first feature vector is input. In an exemplary embodiment, the second machine learning model 123 may use a generative model such as a generative adversarial network (GAN), a variational auto encoder (VAE), and a recurrent neural network (RNN).

The difference of images vector generation module 106 may generate a difference of images between the classification target image and the fake image. The difference of images vector generation module 106 may generate the difference of images by calculating a difference between a value of each pixel of the classification target image and a value of each pixel of the fake image. The difference of images vector generation module 106 may generate a difference of images vector by converting the generated difference of images into preset one-dimensional matrix data.

The difference of feature vectors generation module 108 may generate a second feature vector and a third feature vector by respectively inputting the classification target image and the fake image to a third machine learning model. Here, a feature vector generated by inputting the classification target image to the third machine learning model may be referred to as the second feature vector, and a feature vector generated by inputting the fake image to the third machine learning model may be referred to as the third feature vector.

Figure 5:
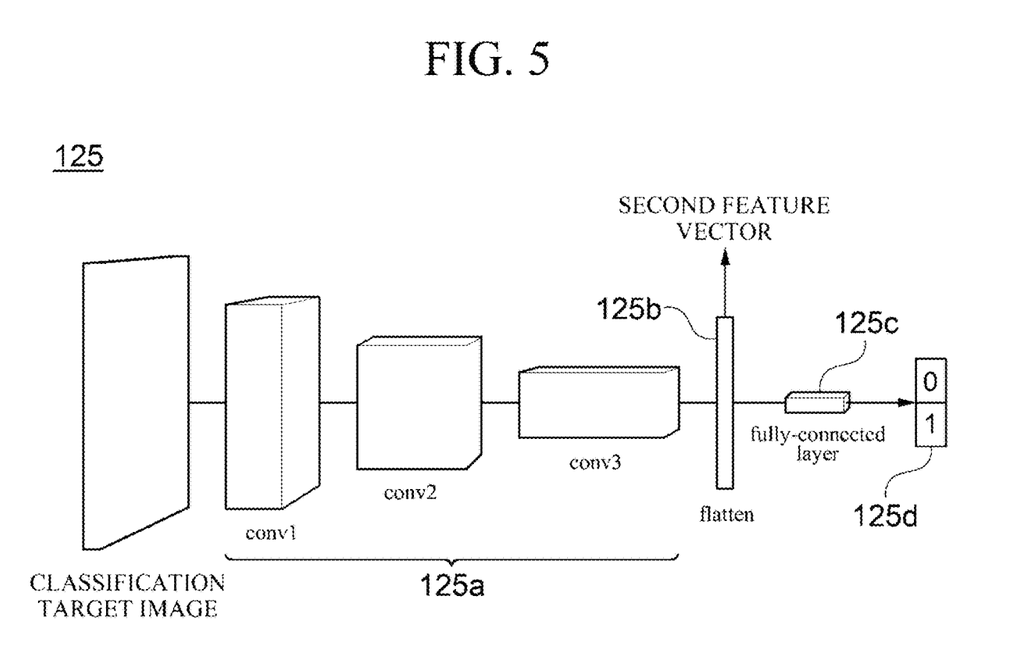
FIGS. 5 and 6 are diagrams schematically illustrating states in which a second feature vector and a third feature vector are respectively generated in a difference of feature vectors generation module according to an embodiment of the present invention.
Figure 6:
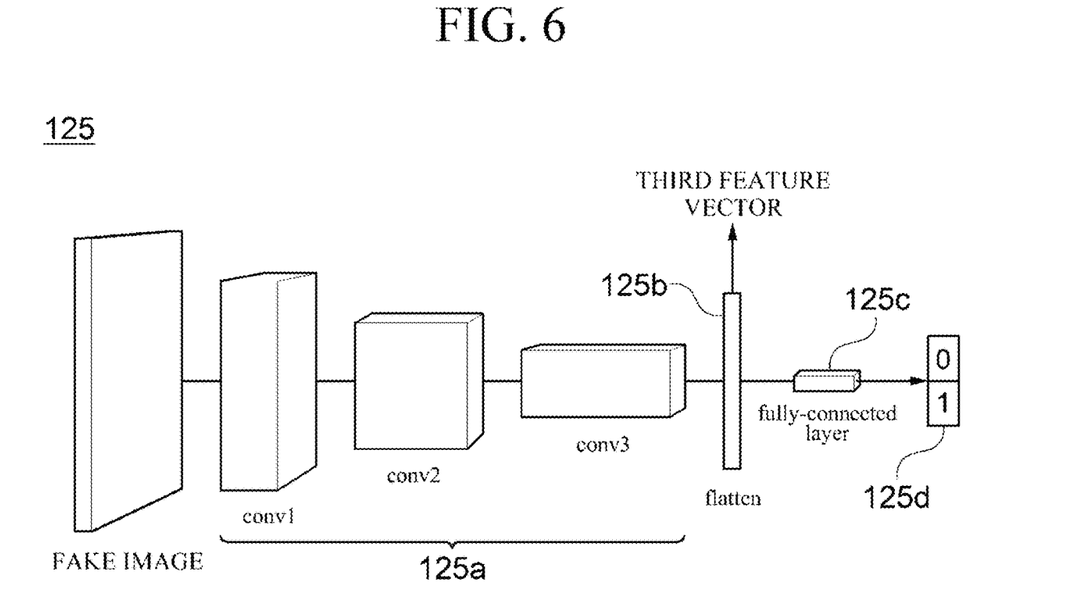

FIGS. 5 and 6 are diagrams schematically illustrating states in which a second feature vector and a third feature vector are respectively generated by the difference of feature vectors generation module 108 according to an embodiment of the present invention.

Referring to FIG. 5, the difference of feature vectors generation module 108 may input the classification target image to a third machine learning model 125. The third machine learning model 125 may be a machine-learned model to output a classification value as to whether the input image is composed of only the background (e.g., a product shelf, etc.) or another image (i.e., an image not composed of only the background) when the classification target image or the fake image is input. For example, the third machine learning model 125 may output a value between zero and one as the classification value. In this case, the closer the classification value is to zero, the more likely the input image may be an image composed of only the background. The closer the classification value is to one, the more likely the input image may be an image that is not composed of only the background.

The third machine learning model 125 may include one or more of a plurality of convolution layers and pooling layers. Here, it is illustrated that the third machine learning model 125 includes three convolutional layers 125a, but is not limited thereto. Each convolutional layer can extract feature values of pixels (i.e., 9 pixels) corresponding to a filter of a preset size (e.g., 3×3 pixel size) while moving the filter from the input image (i.e., the classification target image or the fake image) at predetermined intervals.

In addition, the third machine learning model 125 may include a flatten layer 125b that converts the feature values extracted from the convolutional layer 125a into one-dimensional data, a fully-connected layer 125c for classifying a class based on the one-dimensional data converted by the flatten layer 125b, and an output layer 125d for outputting a classification value (e.g., a value between zero and one).

Here, when the image input to the third machine learning model 125 is the classification target image, the difference of feature vectors generation module 108 may extract the output of the flatten layer 125b to be the second feature vector. In addition, as illustrated in FIG. 6, when the image input to the third machine learning model 125 is the fake image, the difference of feature vectors generation module 108 may extract the output of the flatten layer 125b to be the third feature vector.

That is, the third machine learning model 125 is a machine-learned model to output a classification value for the input image as to whether the input image is an image composed of only the background (e.g., a product shelf, etc.) or an image that is not composed of only the background, but the difference of feature vectors generation module 108 extracts the output of the platen layer 125b in the process to use the output as the second feature vector or the third feature vector. Here, since the second feature vector and the third feature vector are outputs of the flatten layer 125b, the second and third feature vectors become data in the form of a one-dimensional matrix. In addition, the second feature vector and the third feature vector become data of the same size.

The difference of feature vectors generation module 108 may generate a difference of feature vectors between the second feature vector and the third feature vector. The difference of feature vectors generation module 108 may calculate a difference between each matrix value of the second feature vector and each matrix value of the third feature vector in the form of the one-dimensional matrix to generate a difference of feature vectors having the same size as the second feature vector and the third feature vector.

The image classification module 110 may classify the classification target image based on the difference of images vector, the second feature vector, and the difference of feature vectors. Specifically, the image classification module 110 may input the difference of images vector, the second feature vector, and the difference of feature vectors to a fourth machine learning model to classify whether the classification target image is an image composed of only the background or an image in which a specific object exists in addition to the background.

Here, the fourth machine learning model may be a machine-learned model to output a classification value as to whether the corresponding classification target image is composed of only the background or an image in which a specific object exists in addition to the background when the difference of images vector, the second feature vector, and the difference of feature vectors are input. For example, the fourth machine learning model may output a value between zero and one as the classification value. In this case, the closer the classification value is to zero, the more likely the input image may be an image composed of only the background. The closer the classification value is to one, the more likely the input image may be an image including a specific object in addition to the background.

Figure 7:
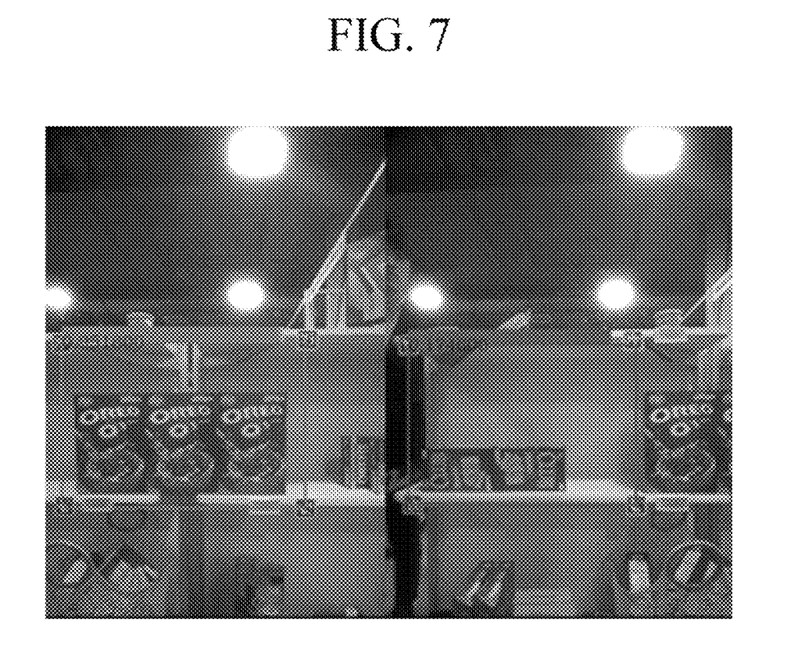
FIG. 7 is a view illustrating a state in which a classification value is output from an image classification module 110 according to an embodiment of the present invention.

FIG. 7 is a view illustrating a state in which a classification value is output by the image classification module 110 according to an embodiment of the present invention. In FIG. 7, an image of the left product shelf has a classification value of 0.951800, indicating that the image was found to have a high probability of including a specific object (i.e., a product) in addition to the background (i.e., a product shelf), and an image of the right product shelf has a classification value of 0.174600, indicating that the image was found to have a high probability that the image is composed of only the background.

Here, when the difference of images vector, the second feature vector, and the difference of feature vectors are all data in the form of one-dimensional matrix data, and the image classification module 110 concatenates the difference of images vector, the second feature vector, and the difference of feature vectors, respectively, to input one one-dimensional data to the fourth machine learning model. The fourth machine learning model may include a fully-connected layer having the same size as the concatenated one-dimensional matrix data. The fourth machine learning model may output a classification value by inputting the concatenated one-dimensional matrix data to the fully-connected layer.

In this specification, a module may mean a functional and structural combination of hardware for implementing the technical idea of the present invention and software for driving the hardware. For example, the "module" may mean a logical unit of a predetermined code and a hardware resource for executing the predetermined code, and does not necessarily mean a physically connected code or one type of hardware.

According to the disclosed embodiment, a first feature vector is extracted through a first machine learning model when a classification target image is input, a fake image is generated using the first feature vector, a difference of images vector is generated based on the difference between the classification target image and the fake image, a difference of feature vectors between a second feature vector and a third feature vector generated by inputting the classification target image and the fake image to a third machine learning model is generated, and the classification target image is classified based on a difference of images vector, a second feature vector, and a difference of feature vectors, thereby capable of improving the accuracy of classification and performing accurate classification on various images regardless of an object and a background.

Meanwhile, the apparatus 100 for classifying the image classifies the classification target image through the first machine learning model to the fourth machine learning model. Hereinafter, a learning sequence and a learning method of each machine learning model will be described. The apparatus 100 for classifying the image may train the second machine learning model. Specifically, the apparatus 100 for classifying the image may input a random first feature vector of a preset size to the second machine learning model. Here, the random first feature vector may be a first feature vector extracted from a random image. The random image may be an image having a background environment similar to that of the classification target image, or may be an image having the background environment completely different from that of the classification target image. When the first feature vector is input, the second machine learning model may output the fake image (i.e., an image in which only the background exists in the classification target image and no specific object exists).

The apparatus 100 for classifying the image may input the fake image output from the second machine learning model to the third machine learning model. Then, the third machine learning model may output a classification value as to whether the input fake image is an image composed of only the background or an image in which a specific object exists in addition to the background.

Here, since the second machine learning model is trained to output the fake image in the form in which only the background exists and no specific object exists in the classification target image, the apparatus 100 for classifying the image may train the second machine learning model by adjusting each parameter (e.g., filter weight, various function values, etc.) of the second machine learning model based on the classification value of the third machine learning model. That is, according to the classification value of the third machine learning model, each parameter of the second machine learning model may be adjusted in a direction in which the second machine learning model outputs the fake image in the form in which only the background exists and no specific object exists in the classification target image.

Next, the apparatus 100 for classifying the image may train the third machine learning model. Specifically, the apparatus 100 for classifying the image may receive, as training data, images (e.g., images obtained by photographing only an actual empty product shelf) obtained by photographing only an actual background in the same background environment as the classification target image and fake images (e.g., images that are learned and output as an empty product shelf) output from the second machine learning model. The apparatus 100 for classifying the image may train the third machine learning model by adjusting each parameter of the third machine learning model according to the classification value output from the third machine learning model.

The apparatus 100 for classifying the image trains the second machine learning model and the third machine learning model in this manner, and may alternately train the second machine learning model and the third machine learning model.

Next, the apparatus 100 for classifying the image may train the first machine learning model. When the classification target image is input, the image classification apparatus 100 may train the first machine learning model so that the fake image generated through the first machine learning model and the second machine learning model becomes an image in the form in which only the background exists and no specific object exists in the classification target image. For example, when the classification target image is an image obtained by photographing the product shelf, the apparatus 100 for classifying the image may train the first machine learning model so that the first feature vector is generated in a direction in which the fake image generated through the first machine learning model and the second machine learning model becomes an image in the form of an empty product shelf. To this end, the apparatus 100 for classifying the image may set a loss function of the first machine learning model as expressed in Expression 1 below. In addition, the apparatus 100 for classifying the image may train the first machine learning model so that this loss function is reduced.

Loss Function=first weight×(average value of differences between pixel values between classification target image and fake image)+second weight×(average value of differences between matrix values between feature vector of classification target image and feature vector of fake image)     Expression 1

Here, the feature vector of the classification target image may be the second feature vector. That is, the feature vector of the classification target image may be obtained by extracting the output of the flatten layer 125b when the classification target image is input to the third machine learning model 125. In addition, the feature vector of the fake image may be the third feature vector. That is, the feature vector of the fake image may be obtained by extracting the output of the flatten layer 125b when the fake image is input to the third machine learning model 125.

In addition, the sum of the first weight and the second weight may be one, and the second weight may be set higher than the first weight. In an exemplary embodiment, the first weight may be set to 0.3 and the second weight may be set to 0.7, but is not limited thereto.

Next, the apparatus 100 for classifying an image may train the fourth machine learning model. That is, the apparatus 100 for classifying the image may train the fourth machine learning model by using the results (difference of images vector, second feature vector, and difference of feature vectors) of the previously trained first to third machine learning models as input.

Figure 8:
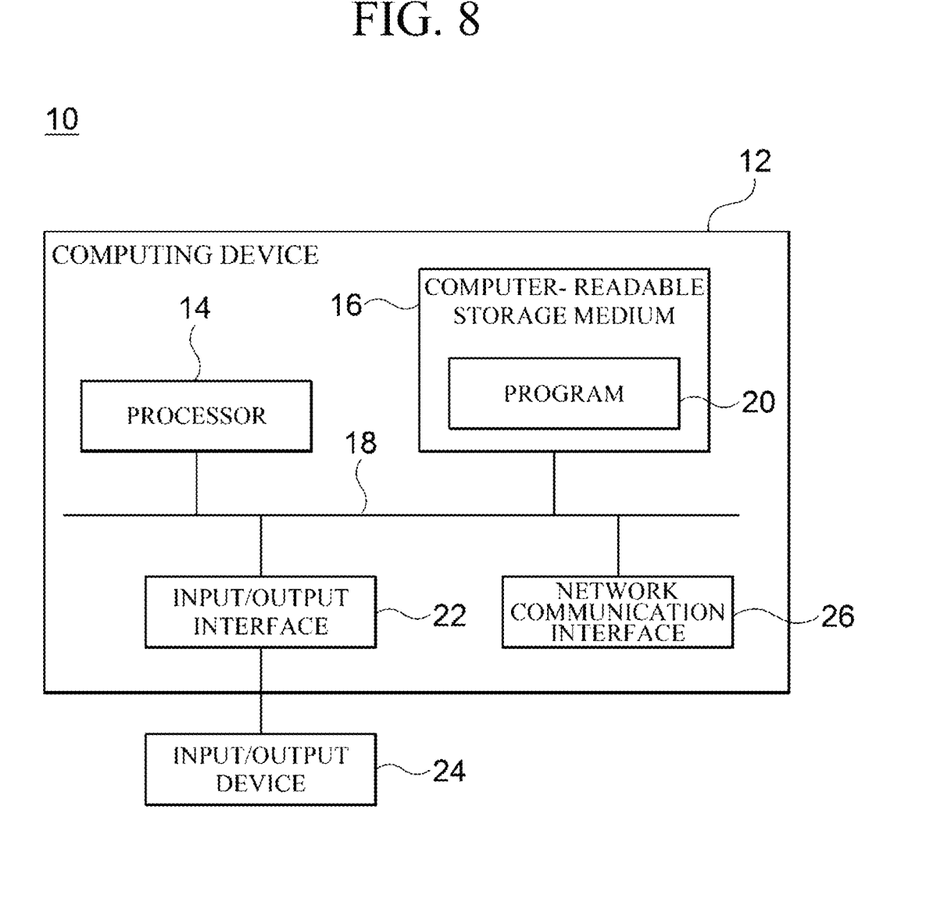
FIG. 8 is a block diagram illustratively describing a computing environment including a computing device suitable for use in exemplary embodiments.

FIG. 8 is a block diagram illustratively describing a computing environment 10 including a computing device suitable for use in example embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the apparatus 100 for classifying the image.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the exemplary examples of the present invention have been described in detail above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. An apparatus for classifying an image, the apparatus being a computing device including one or more processors and a memory storing one or more programs executed by the one or more processors, the apparatus being a computing device comprising:
    a fake image generation module that receives a classification target image and generates a fake image in a form in which only a background exists and no specific object exists in the classification target image;
    a difference of images vector generation module that generates a difference of images between the classification target image and the fake image and generate a difference of images vector by converting the generated difference of images into preset one-dimensional matrix data;
    a difference of feature vectors generation module that generates a difference of feature vectors between a feature vector generated based on the classification target image and a feature vector generated based on the fake image; and
    an image classification module that classifies the classification target image based on the difference of images vector, the feature vector generated based on the classification target image, and the difference of feature vectors.

2. The apparatus of claim 1, wherein the fake image generation module comprises:
    a first machine learning model trained to extract a first feature vector of a preset size by reducing dimensions of the classification target image when the classification target image is input; and
    a second machine learning model trained to output the fake image by using the first feature vector output from the first machine learning model as an input.

3. The apparatus of claim 2, wherein the first feature vector is one-dimensional matrix data; and
    the fake image has the same size as the classification target image.

4. The apparatus of claim 2, wherein the difference of feature vectors generation module includes a third machine learning model which is trained to extract a second feature vector by using the classification target image as an input and extract a third feature vector by using the fake image as an input.

5. The apparatus of claim 4, wherein the third machine learning model is a model trained to output a classification value as to whether an image input to the third machine learning model is an image composed of only a background or an image not composed of only the background.

6. The apparatus of claim 5, wherein the third machine learning model is a convolutional neural network (CNN) model including a convolution layer, a flatten layer, and a fully-connected layer; and
    the difference of feature vectors generation module extracts an output of the flatten layer to be the second feature vector when the classification target image is input to the third machine learning model, and extracts the output of the flatten layer to be the third feature vector when the fake image is input to the third machine learning model.

7. The apparatus of claim 6, wherein the image classification module generates one one-dimensional matrix data by concatenating the difference of images vector, the second feature vector, and the difference of feature vectors, respectively; and
    the image classification module includes a fourth machine learning model that is trained to output a classification value of the classification target image when the one one-dimensional matrix data is input.

8. The apparatus of claim 6, wherein a random first feature vector of a preset size is input to the second machine learning model, a fake image output from the second machine learning model is input to the third machine learning model, and parameters of the second machine learning model is adjusted according to a classification value for the fake image output from the third machine learning model.

9. The apparatus of claim 6, wherein when a classification target image is input, the first machine learning model is trained so that the fake image generated through the first machine learning model and the second machine learning model becomes an image in which only a background exists and no specific object exists in the classification target image.

10. The apparatus of claim 9, wherein a loss function of the first machine learning model is set by Expression 1 below, $$\text{Loss Function} = \text{first weight} \times (\text{average value of differences between pixel values between classification target image and fake image}) + \text{second weight} \times (\text{average value of differences between matrix values between feature vector of classification target image and feature vector of fake image}) \quad [\text{Expression 1}],$$

where the feature vector of the classification target image is a second feature vector obtained by extracting the output of the flatten layer when the classification target image is input to the third machine learning model; and the feature vector of the fake image is a third feature vector obtained by extracting the output of the flatten layer when the fake image is input to the third machine learning model.

11. The apparatus of claim 10, wherein a sum of the first weight and the second weight is one, and the second weight is set higher than the first weight.

12. A method for classifying an image performed in a computing device including one or more processors and a memory storing one or more programs executed by the one or more processors, the method comprising:
- receiving a classification target image and generating a fake image in a form in which only a background exists and no specific object exists in the classification target image;
- generating a difference of images between the classification target image and the fake image;
- generating a difference of images vector by converting the generated difference of images into preset one-dimensional matrix data;
- generating a difference of feature vectors between a feature vector generated based on the classification target image and a feature vector generated based on the fake image; and
- classifying the classification target image based on the difference of images vector, the feature vector generated based on the classification target image, and the difference of feature vectors.

* * * * *